DOUBLE FOLDED-Z-CONFIGURATION MONOCHROMATOR

Original Filed Feb. 11, 1959 6 Sheets-Sheet 1

HENRY H. CARY,
INVENTOR.

BY Ralph B. Lawler
ATTORNEY

DOUBLE FOLDED-Z-CONFIGURATION MONOCHROMATOR

Original Filed Feb. 11, 1959 6 Sheets-Sheet 2

HENRY H. CARY,
INVENTOR

BY Reed & Lawler
ATTORNEY.

DOUBLE FOLDED-Z-CONFIGURATION MONOCHROMATOR

Original Filed Feb. 11, 1959 6 Sheets-Sheet 3

HENRY H. CARY,
INVENTOR.

BY Reed B. Lawler
ATTORNEY.

DOUBLE FOLDED-Z-CONFIGURATION MONOCHROMATOR

Original Filed Feb. 11, 1959 6 Sheets-Sheet 4

INVENTOR.
HENRY H. CARY,
By Reed B. Lawler
ATTORNEY.

DOUBLE FOLDED-Z-CONFIGURATION MONOCHROMATOR

Original Filed Feb. 11, 1959 6 Sheets-Sheet 5

HENRY H. CARY,
INVENTOR.

BY Rudolf Lawler
ATTORNEY.

DOUBLE FOLDED-Z-CONFIGURATION MONOCHROMATOR

Original Filed Feb. 11, 1959 6 Sheets-Sheet 6

HENRY H. CARY
INVENTOR.

BY Reed Lawlor
ATTORNEY

United States Patent Office

Re. 26,053
Reissued July 5, 1966

26,053
DOUBLE FOLDED-Z-CONFIGURATION MONOCHROMATOR

Henry H. Cary, Pasadena, Calif., assignor to Applied Physics Corporation, Monrovia, Calif., a corporation of California Original No. 3,098,408, dated July 23, 1963, Ser. No. 795,311, Feb. 11, 1959. Application for reissue July 21, 1965, Ser. No. 475,043
14 Claims. (Cl. 88—14)

Matter enclosed in heavy brackets [ ] appears in the original patent but forms no part of this reissue specification; matter printed in italics indicates the additions made by reissue.

This invention relates to monochromators, and more particularly to improvements in double monochromators. This is a continuation-in-part of my application, Serial No. 477,793 filed December 27, 1954, now abandoned.

In a monochromator, heterogeneous radiation, that is, radiation consisting of components of many wavelengths, entering an entrance aperture, is dispersed in such a way that monochromatic radiation over a narrow band of wavelengths emerges from an exit aperture. In a double monochromator, two dispersing sections are employed, the radiation emerging from one section entering the second section and also being dispersed therein.

Monochromators are employed in spectrophotometers in order to produce spectrograms representing the characteristics of materials under investigation. Monochromators are also employed as sources of illumination, as in investigation of photosynthesis. In this specification, the improved double monochromator of this invention will be described with particular reference to its applications to adsorption spectrophotometry. However, it will be understood that it may be employed in other ways.

In one type of monochromator, which is characterized by a "Z configuration," the arrangement of the slits, collimating mirrors and dispersing element is such that the off-axis spherical aberration introduced by one collimating mirror is opposed by and at least partially cancelled by the off-axis spherical aberration introduced by the other collimating mirror. In another type having a folded-Z configuration, a reflecting surface is provided in the beam between the two collimating mirrors and the various parts are arranged to preserve the compensating characteristics of the two collimating means of a simple Z configuration. In a simple Z configuration, the optical axis includes three legs arranged substantially in the form of a Z, wherein one leg extends from each terminal slit to a corresponding collimating mirror and the third leg extends from one collimating element through the dispersing element to the other collimating mirror. But, in a folded-Z arrangement, the reflecting surface between the two collimating elements causes the collimated beam arriving at the dispersing element from one collimating mirror to be reflected to the second collimating mirror. Usually this reflecting surface is provided by the dispersing element itself.

In accordance with the present invention, a monochromator is provided which employs two monochromator sections arranged in cascade, the optical path in each section being of folded-Z configuration. The monochromator is provided with two terminal slit apertures at opposite ends thereof, either of which may serve as an entrance aperture, and the other of which may serve as an exit aperture. The two legs of the optical paths of the two sections which are remote from the terminal slits are collinear and extend through an intermediate aperture. One of the monochromator sections employs a prism as a dispersing element. This prism is characterized by having a transmission band between a lower-wave-length limit $\lambda_1$ and an upper-wavelength $\lambda_2$. The second monochromator section employs a diffraction grating as a dispersing element. To attain maximum resolving power in the second monochromator section in a long-wavelength region near $\lambda_2$, the spacing between the rulings of the grating is about equal to a multiple of one-half the wavelength $\lambda_2$ of the upper-wavelength limit of the transmission band of the prism.

By employing a double folded-Z configuration in the monochromator, the advantages of employing two dispersing elements of high resolving power are obtained at the same time over a wide-wavelength range and high resolution is attained. The high resolving power is attributable very largely to the employment of the folded-Z configuration in each section, and this advantage would be obtained even though other types of dispersing elements were employed. By setting the grating constant at a value equal to about a multiple of one-half of the upper-wavelength limit of the prism, it becomes possible to scan a spectrum over the entire transmission band of the prism with maximum dispersion in the first-order diffraction spectrum. Such high dispersion is attainable both in a short-wavelength part of the spectrum near the lower-wavelength limit $\lambda_1$ where the prism possesses the higher dispersion and a long-wavelength part thereof near the upper-wavelength limit $\lambda_2$ where the diffraction grating has the higher dispersion. In order to achieve this result, in accordance with the present invention, the prism is rotated more rapidly than the grating in the lower-wavelength part of the spectrum and the grating is rotated more rapidly than the prism in the upper part of the spectrum. Thus, the double monochromator of the present invention is designed particularly to provide continuous scanning of a spectrum over a wide-wavelength range without the necessity of replacing dispersing elements such as prisms or diffraction gratings for scanning different sections of the spectrum.

In accordance with this invention, the two terminal slit apertures are made of about the same width, taking due account of any magnification that occurs in the two monochromator sections. Also, in accordance with this invention, an intermediate aperture is arranged at the junction of the two folded-Z configurations, primarily in order to reduce the amount of stray radiation which can be transmitted from the monochromator section that the radiation enters, to the monochromator section from which the monochromator radiation emerges. Other masks are also provided as needed to reduce the amount of stray radiation scattered from one section to the other along other paths.

In the best mode of practicing the invention now known to me, the entrance and exit apertures and the intermediate aperture are all in the form of slits that are formed by opposing edges of a pair of relatively movable plates, so that the set of slits is readily formed in or near a common plane. Furthermore, the entrance and exit slits are made of the same width, and the intermediate slit has a width which is only slightly greater than that of either the entrance or exit slits. By employing such an arrangement, the ratio of the intensity of monochromatic radiation emerging from the exit slit of the monochromator is very high compared with the amount of stray radiation of other wavelengths emerging therefrom.

Also, in accordance with the present invention, a transformer interconnecting the prism dispersing element and the diffraction grating element is so designed as to provide simultaneous rotation of the prism and the diffraction grating at such rates as to scan a spectrum over a wide range, including a low-wavelength part of the transmission spectrum of the prism and a high-wavelength part of the transmission spectrum. Furthermore, means are provided for driving the diffraction grating and the prism in such a way that the wavelength of the monochromatic radiation emerging from the monochromator is indicated on a linear scale.

While the monochromator of the present invention is not the first to employ two dispersing elements in cascade, and is not even the first to employ both a dispersing prism and a diffraction grating as such elements, it is believed to be the first monochromator which makes possible the attainment of high resolving power throughout a wide-wavelength range including a low-wavelength part in which the dispersion of the prism is higher than that of the diffraction grating and a long-wavelength part thereof in which the dispersion of the diffraction grating is higher than that of the prism. Furthermore, even though monochromators heretofore have been employed which utilize both a prism dispersing element and a diffraction dispersing element, so far as I know, all such prior monochromators have employed the prism merely as an order-sorter. In such monochromators, the terminal slit of the prism monochromator is very wide compared with the width of the other terminal slit and the width of the intermediate slit, while the latter two slits have about the same width. The most pertinent prior art of which I have knowledge relating to such double monochromators is to be found in an article entitled, "Sur la Construction d'un Spectrographe Infra-Rouge Auto-Enregistreur, a Grand Pouvoir de Resolution, et al." by M. Migeotte that is printed in a rare publication "Memoires de la Societe Royale des Sciences de Liege," collection IN-4°—Tome I—Fascicule 3 et dernier, pages 529–590, published by Marcel Hayez, Imprimeur de l'Academie Royale de Belgique, Brussels, Belgium (1945).

In the spectrograph disclosed by M. Migeotte and illustrated in plate 9, a double monochromator is described in which a prism dispersing element is employed as an order-sorter, the entrance to the prism section being very wide. In such a system, the prism merely selects a fraction of the spectrum that is much, much wider than the width of the band of monochromatic radiation that is to be produced. This part of the spectrum enters the diffraction grating section so as to permit the production therein of an emerging monochromatic band free of interference from unwanted spectra, such as second and higher order diffraction spectra. Migeotte went somewhat father than his predecessors in that he employed automatic means for rotating the diffraction grating and at the same time employed a cam mechanism for rotating the prism simultaneously with diffraction grating. However, his instrument was usable only in the high-wavelength part of the transmission spectra of his prisms, and thus did not make use of the high dispersion characteristics of his prisms at the low-wavelength parts of their transmission spectra as well as the high dispersion characteristics of his diffraction gratings in the high-wavelength parts of those transmission bands.

By use of the configuration of optical paths, an arrangement of slits and a transformer that interconnects a rotating prism and a rotating diffraction grating of the present invention, a double monochromator is provided that is of superior resolving power and of increased ratio of monochromatic radiation intensity, and which is capable of use over a very wide-wavelength range.

The foregoing, and other features and advantages of this invention, will be set forth in the following description of a specific spectrophotometer embodying the invention. Even though the invention is described herein only with reference to one specific embodiment thereof and only with reference to its application in the field of spectrophotometery, it is to be understood that the invention may be embodied in many other forms within the scope of the appended claims.

A specific embodiment of the invention is described hereinafter with reference to the accompanying drawings, wherein.

GENERAL DESCRIPTION

Figure 1:
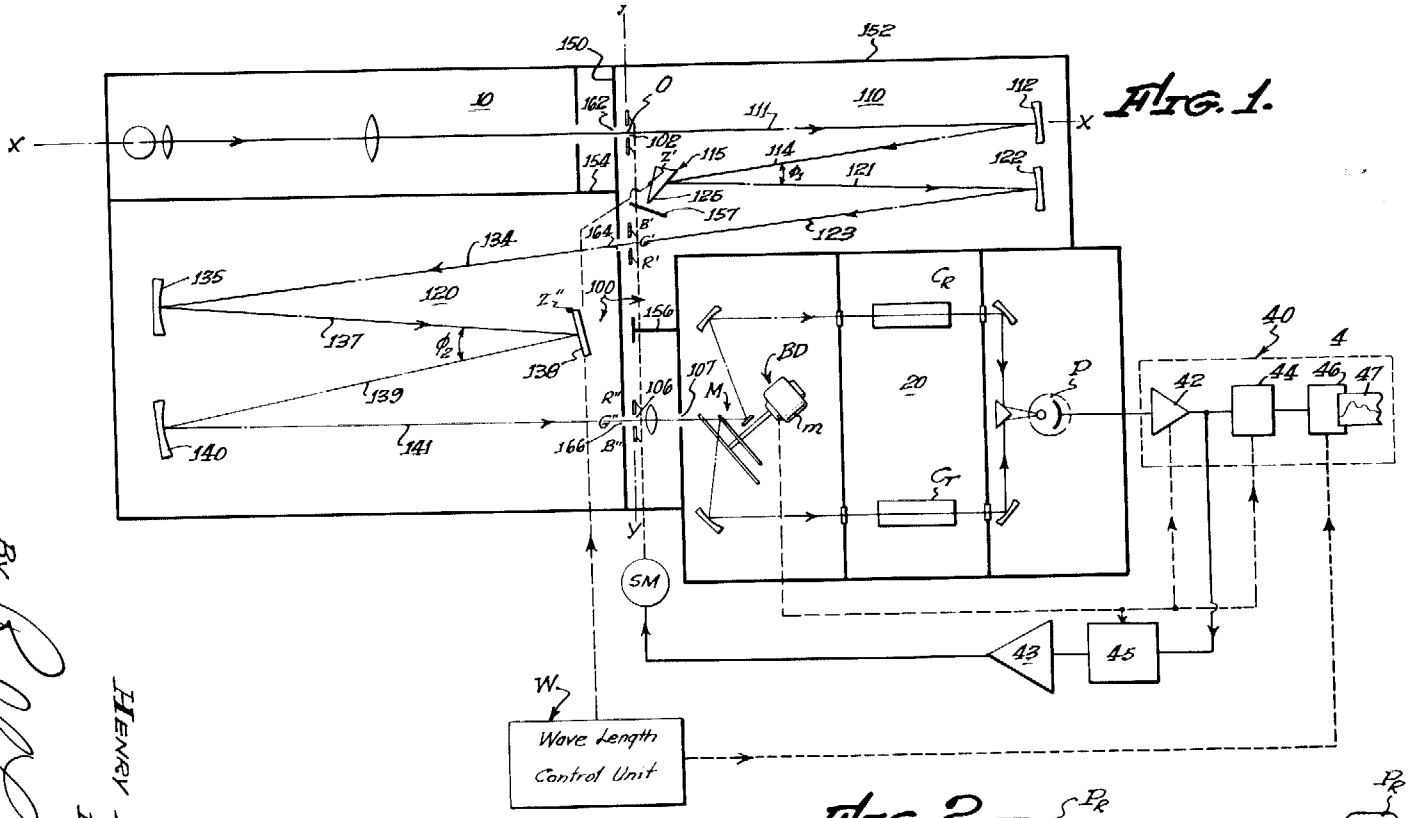
FIGURE 1 is a schematic diagram of a horizontally arranged spectrophotometer embodying the present invention.

In the drawings, and more particularly in FIG. 1, there is illustrated a spectrophotometer that embodies the present invention. This spectrophotometer includes a source 10 of radiation, a double monochromator 100, and a sample comparator 20, together with certain auxiliary equipment including a measuring device 40. The invention resides primarily in various features of the monochromator 100, and in the combination of these features with other parts of the spectrophotometer.

Considered broadly, the double monochromator 100 comprises a first section 110 between a first aperture in the form of an entrance slit 102, a second aperture in the form of an intermediate slit 104, and a second section 120 between the intermediate slit 104 and a third aperture in the form of an exit slit 106. Heterogeneous radiation from the source 10 entering the first slit 102 is separated into a spectrum which lies adjacent the exit slit 106, thereby causing monochromatic radiation to emerge from the exit slit. More particularly, heterogeneous radiation entering the entrance slit 102 is dispersed in the first monochromator section 110 to form a spectrum at an intermediate slit 104 and selected radiation passing through the intermediate slit 104 is further dispersed in the second monochromator section 120 to cause monochromatic radiation in a narrow band of wavelengths containing very little stray light to emerge from the exit slit 106.

The emerging monochromatic radiation, enters the comparator 20, where a beam director BD, which includes a motor m that rotates a mirror-chopper device comprising a mirror M′ and beam chopper, causes a portion of the radiation to pass through a reference cell $C_R$, and another portion to pass through a test cell $C_T$. As explained more fully in co-pending patent application Serial No. 411,650, filed February 23, 1954, now Patent Number 3,022,704, issued February 27, 1962, to Henry H. Cary, the beam deflector BD periodically transmits radiation through the reference cell $C_R$ and through the sample cell $C_T$ to a photoelectric detector P.

Figure 2:
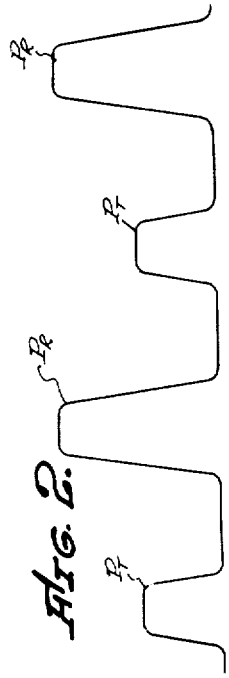
FIG. 2 is a graph representing signals produced in the spectrophotometer.

With this arrangement, two alternating series of pulses of light are transmitted to the photocell P, as indicated in FIG. 2. One series of pulses $P_R$ corresponds to the radiation transmitted through the reference cell. The other series of pulses $P_T$ corresponds to the radiation transmitted through the test cell $C_T$. As more fully described in patent application Serial No. 411,794, filed by Henry H. Cary and Roland C. Hawes on February 23, 1954, now Patent Number 3,025,746, issued March 20, 1962, the ratio of the amplitudes of the two sets of pulses is measured in the measuring circuit 40. More particularly, as explained in said patent application Serial No. 411,794, the two sets of pulses are amplified by the amplifier 42, and they are segregated and compared in the ratio measuring circuit 44, and the resultant ratio is recorded on a recorder 46 as a function of wavelength to form a spectrogram 47. The separation of the pulses in the recorder 46 and certain other desired functions are accomplished by means of a timing mechanism controlled by the beam deflector BD. The production of the desired spectrogram is accomplished by advancing the recording paper 45 of the recorder 46 past a recording element (not shown) by means of a wavelength control unit W and by simultaneously varying the wavelength of the monochromatic radiation emerging from the exit slit 106. By means of this invention it is a simple matter to produce a spectrogram in which the wavelength scale is linear throughout a wide range.

Optical layout

For convenience, the location of any point in the monochromator is described by the expression (x,y) of a system of Cartesian co-ordinates in which horizontal distances (y) in inches parallel to the vertical planes Y—Y through the slits 102, 104 and 106 are taken as ordinates, and horizontal distances (x) in inches parallel to the vertical plane X—X normal thereto and passing through the entrance slit 102 are taken as abscissae. The origin O of the co-ordinate system so formed is at the center of the entrance slit 102. In this system the positions of the slits 102, 104 and 106 are respectively (0, 0), (0, −3.11) and (0, −8.34).

In considering the construction and operation of the monochromator 100, specific reference is made hereinbelow to a central ray entering the entrance slit 102 and travelling along path sections 111, 114, 121, 123, 134, 137, 139 and 141, and emerging from the exit slit 106 as monochromatic radiation. Even though in practice the line along which the slits 102, 104 and 106 lie is horizontal, and the plane in which the central rays enter the monochromator and emerge therefrom lie in a horizontal plane, when referring to co-ordinate positions with reference to the plane X—X positive positions or directions are referred to as "above," and negative positions are referred to as "below," and when referring to co-ordinate positions with reference to the plane Y—Y, positive positions and directions are referred to as to the "right" and negative positions and directions are referred to as to the "left." It will also be understood, of course, that the terms up and down, right and left, and the like, have no absolute significance but are purely relative.

It will also be understood that the specific dimensions and orientations, and characteristics and arrangement of elements of the monochromator described, are presented for purposes of illustration only, and that many variations in such dimensions and orientations and characteristics and arrangement of the elements may be made without departing from the principles of the invention.

In the monochromator 100 of FIG. 1 the first monochromator section 110 is a prism monochromator and the second monochromator section 120 is a diffraction-gating monochromator. The first section 110 and the second section 120 lie on opposite sides of the set of slits 102, 104 and 106, all of which face in the same direction. Each section is of folded-Z configuration employing front surface mirrors as collimating elements, and the parts of the light transmission paths of the two sections that terminate at the intermediate slit 104 are collinear. Each section of the double monochromator thus formed possesses a minimum number of reflecting surfaces and a low amount of off-axis spherical aberration and coma.

The radiation emerging from the exit slit 106 is not truly monochromatic but includes a narrow band of wavelengths, and also a very small amount of stray light. For convenience, the wavelength at the center of the band of emerging radiation is referred to herein sometimes as the true wavelength. The true wavelength differs somewhat from the nominal or indicated wavelength that is indicated by the wavelength dial of the instrument, as described hereinafter. In a carefully made instrument of the type that is described herein, the indicated wavelength may never depart from the true wavelength by more than about 4 A. over a wavelength range from about $0.20\mu$ to about $3.0\mu$.

The first section 110 is formed by a prism monochromator of the Czerny type. Heterogeneous radiation entering the entrance slit 102 travels in a positive direction along a path section 111 normal to the plane Y—Y and strikes a spherical front-surface collimating mirror 112, the center of which is at the position (11.8, 0). The length of the path section 111 is this 11.8″, and the effective focal length of the mirror 112 is 11.8″. Heterogeneous radiation is thus transmitted in a negative direction along the path section 114 at an angle of about 189° to the dispersing prism 115.

Figure 3:
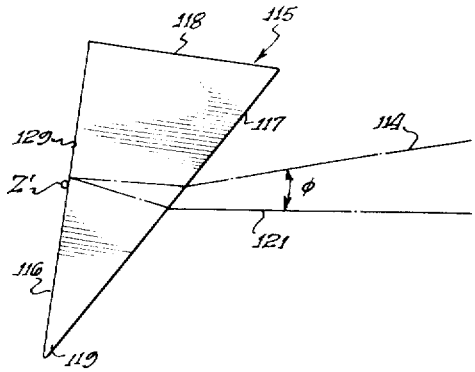
FIG. 3 is an enlarged diagram showing the path of a central ray through the prism.

As indicated in FIG. 3, the long, or altitude, side face 116 of the prism 115 passes through the vertical axis Z′ of rotation while the hypotenuse face 117 lies to the right thereof. The short, or base, side face 118 of the prism lies above the pivot axis Z′, the apex 119 of the prism thus being directed downwardly. The prism 115 has a totally reflecting mirror 129 formed on its altitude face 116 and has an apex angle of 30°, thereby providing in effect, a 60° refracting prism. The prism employed in the embodiment of the invention described herein is formed of fused silica. The length of the altitude face 116 is about 1½″.

The prism 115 is mounted for rotation about a vertical axis Z′ that is located at the position (+1.25, −1.47). The axis Z′ lies near the center of the altitude face 116 of the prism 115 nearest the slit plane Y—Y. The exact orientation of the mirror 112 is such that the collimated beam enters the hypotenuse face 117 of the prism.

As indicated more clearly in FIG. 3, a ray that enters the prism 115 along the path section 114 strikes the mirror 116 at the back of the prism and is reflected to the right, emerging from the prism to the right. The monochromatic radiation of the wavelength which is of interest is transmitted to the right along the path section 121 that forms an angle of −9°30′ with the path section 114. This dispersed radiation then strikes a second front-surface collimating mirror 122 which reflects it downwardly and to the left along the path section 123 to the intermediate slit 104. The mirror 122 which has an effective focal length of 11.8″ and which is located at a position along the path section 123 that is 11.8″ from the intermediate slit 104 focuses different wavelength components of the radiation emerging from the prism 115 at the intermediate slit. The path section 123 extends in a direction of about 186°30′.

With the prism monochromator section, a real monochromatic image of nominal wavelength of the entrance slit 102 is formed at the intermediate slit 104. The wavelength of the nominal monochromatic radiation located at this position may be varied by rotating the prism about its axis of rotation Z′. As indicated in FIG. 1 by the symbols R′, G′ and B′ on the right side of the intermediate slit 104, monochromatic real images of the entrance slit of shorter-wavelength radiation are located above the intermediate slit, and monochromatic real images of the exit slit of longer-wavelength radiation are located below the intermediate slit 104.

The diffraction grating section 120 of the monochromator is of the reflection-grating type. Monochromatic radiation transmitted along the path section 123 enters the diffraction grating section along the path section 134 which is collinear therewith. The radiation entering the diffraction grating section 130 travels along the path section 134 a distance of 15.74″ to a front-surface spherical collimating mirror 135 having a focal length of 15.74″. The collimated radiation reflected by the mirror 135 travels along the path section 137 to the diffraction grating 138. The position of the mirror 135 is adjusted so that the central ray travels along a path section 137 that intersects the center of the grating 138 when the latter is in a position to reflect white light along a path section 139. This occurs when the grating is in the "zero-order" position in which the grating acts as a plane mirror having a normal that bisects the angle between the two path sections 137 and 139. The diffraction grating 138 is rotatable about a vertical axis Z″ to vary the nominal wavelength of the monochromatic radiation which is to be produced by the monochromator. To minimize absorption by the prism, the axis of rotation Z″ of the grating, which is located at the position (—3.87″, —4.90″) is approximately conjugate to the position of the apex 125 of the prism 115.

In the grating section 120, radiation of the nominal monochromatic wavelength travels to the left along the path section 139 in the direction of about +191°30′ to a front-surface spherical collimating mirror 140 having an effective focal length of 15.74″. The radiation reflected by the focusing mirror 140 travels to the right along the path section 141, where it is focused at the exit slit 106, 15.74″ from the focusing mirror. The path section 141 extends in a direction of 0°, the two path sections 141 and 111 being parallel and both being perpendicular to the plane Y—Y of the slits 102, 104 and 106.

As indicated in FIG. 1 by the letters R″, G″ and B″, if heterogeneous radiation enters the intermediate slit 104, then a real monochromatic image of the intermediate slit 104 of the nominal wavelength is formed at the exit slit 106, and real monochromatic images of the intermediate slit 104 of longer wavelength are formed above the slit 106, while real monochromatic images of the intermediate slit 104 of shorter-wavelength are formed below the exit slit 106.

In accordance with this invention, the two dispersing elements, namely, the prism 115 and the grating 138, are so oriented with respect to the incident beams that their effects in dispersing radiation are cumulative. This is done in the present embodiment of the invention by mounting the prism with its apex on the lower side, that is on the left side of the incident beam as viewed in the direction of travel along the beam, and by mounting the grating in a position rotated counter-clockwise from the zero-order position. Counter-clockwise rotation of the prism 115 causes the nominal wavelength of the radiation passing through the intermediate slit 104 to increase. Counter-clockwise rotation of the diffraction grating also causes the nominal wavelength of radiation transmitted from the intermediate slit 104 to the exit slit 106 to increase. The angles of rotation are so coordinated by means of a mechanical transformer that the nominal wavelength of radiation transmitted through the prism section 110 is the same, or substantially the same, as the nominal wavelength of the radiation transmitted through the diffraction grating section 120. The specific transformer that is described in detail hereinafter operates to render the monochromator 100 effective throughout a wide-wavelength range extending from a short distance above the short-wavelength absorption band of the prism to a wave-length slightly below the maximum wave-length of the first order spectrum produced by the diffraction grating 138.

So far as the dispersing properties of the monochromator 100 are concerned, the intermediate slit 104 is not needed, because the dispersing properties of the prism 115 and the grating 138 are additive. However, the intermediate slit 104 along with suitable walls and masks are employed in order to minimize the amount of stray radiation transmitted through the instrument. More particularly, a main transverse wall 150 is arranged within the housing 152 for mounting the slits 102, 104 and 106, as described in more detail hereinafter. Furthermore, a wall section or mask 154 is provided to isolate the source 10 from the diffraction section 120 so as to prevent any radiation from entering the diffraction section without first passing through the prism section 110. Furthermore, a baffle or mask 156 is provided to minimize any excess leakage of stray radiation from the prism section 110 to the entrance 107 of the comparator 20 without first passing through the diffraction section 120. Furthermore, the entire housing is of light-tight construction so as to prevent any radiation from entering the monochromator 100 except through the entrance slit 102 and the exit slit 106. Normally, however, no radiation will enter the exit slit 106 when the instrument is used in the arrangement shown, since the sample compartment 20 is also light-tight. Thus, the only radiation transmitted through the monochromator 100 is that which enters the entrance slit 102 and passes through both the intermediate slit 104 and the exit slit 106. By mounting the slits 102, 104 and 106 close to the wall 150, no light leaks past the sides of the slits through the monochromator.

It will be noted that the collimating mirrors 112 and 122 on each side of the prism 115 are of the same focal length and the collimating mirrors 135 and 140 on each side of the diffraction grating 138 are of the same focal length. For this reason each of the monochromator sections 110 and 120 possesses an optical magnification of about unity. The departure from unity in the magnification arises from the fact that, normally, the width of the monochromatic collimated beams incident on and emerging from each dispersing element are different. The specific embodiment of the invention is designed to be equally effective regardless of which terminal slit is used for the entrance slit and which is used for the exit slit. Accordingly, the entrance slit 102 and the exit slit 106 are made of the same width, in order to achieve maximum intensity for a given resolving power. If, for some reason, the magnification of one or more of the sections were not about unity, in any event, the width of each terminal slit should be made substantially equal to the width of a pure monochromatic geometrical image of the other terminal slit 102 formed at the position of the first mentioned terminal slit.

In order to overcome or compensate for curvature effects caused by the prism 115 and the grating 138, the slits 102 and 106 are curved in opposite directions, while the intermediate slit 104 is curved in the same direction as the entrance slit 102. The curvature of the entrance slit 102 and the intermediate slit 104 are substantially equal, whereas the curvature of the exit slit 106 is less than either of the foregoing slits. The radii of curvatures may have different values, but in a specific instance the various radii of curvatures of slits 102, 104 and 106 were respectively 20.22″, 20.22″, and 32.8″. Due to the fact that the index of refraction of the prism 115 and the angle of inclination of the diffraction grating relative to the rays 137 and 139 vary with wavelength, the actual curvature of the image of the entrance slit 102 formed at the exit slit 106 varies somewhat with wavelength.

Where in this specification, reference is made to a monochromatic image of one slit at the position of another, it is to be understood that the monochromatic image referred to is not necessarily an actual image formed at the position in question by radiation transmitted from the position of the first slit to the position of the second slit, but is merely one that could be formed there if radiation were transmitted in the proper direction. Thus, for example, where reference is made hereinafter to a monochromatic image of the exit slit at the intermediate slit in the specific monochromator illustrated in FIG. 1, it will be recognized that no such image is actually formed there due to the fact that no radiation is actually being transmitted from the exit slit to the intermediate slit. Nevertheless, the term has a real meaning even though in the particular application of the device radiation may be transmitted not in such a direction as to form the image in question, but in the opposite direction. Ideally, the intermediate slit 104 could very well be of the same width as the entrance slit 102. This would result in the maximum reduction of stray light. However, due to slight errors in parts of the instrument and slight variations in their operation from time to time, the image of the entrance slit 102 formed at the intermediate slit 104 at any single nominal wavelength may be displaced somewhat from the image of the exit slit 106 formed at the intermediate slit 104 at the same nominal wavelength. For this reason in order to be certain that radiation of the same true wavelength is transmitted by both monochromator sections 110 and 120, the width of the intermediate slit 104 is made slightly greater than the width of either of the terminal slits 102 or 106. In the specific monochromator described herein the excess width of the intermediate slit was about 0.01".

The general layout of the optical paths of the two monochromator sections provides a compact double monochromator in which reflection losses and stray light are reduced to a minimum. The minimization of reflection losses and off-axis spherical aberrations and coma is produced by employing two monochromator sections in each of which the ray paths are of W or folded-Z configuration, and in which the emergent ray of the first monochromator forms the entering ray of the second monochromator. More particularly, it will be observed that each of the monochromator sections 110 and 120 includes a single reflecting spherical mirror on each side of its dispersing element. The use of front-surface mirrors is superior to the use of lenses because they do not introduce chromatic aberration, and thus can be set for best focus with visible light, which focus need not be readjusted when employing the instrument in either the ultraviolet or infrared regions. Furthermore, front-surface mirrors have only one light-scattering surface, whereas a lens has two.

By surfacing the spherical mirrors with a suitable high reflecting material spectral differences in reflection coefficients may be minimized throughout the wavelength range in which the instrument is to be used. In this particular spectrophotometer, which is designed to operate over a wavelength range from $0.2025\mu$ to about $3.0\mu$ the mirrors may be coated by evaporation of aluminum onto them to render the monochromator efficient in the ultraviolet region as well as elsewhere. In the prism monochromator, in addition to the spherical mirrors 112 and 122, a reflecting surface 129 is located at the altitude face 129 of the prism 115, so that in all three reflecting surfaces, the very minimum attainable in a prism monochromator are employed. In the diffraction grating section 120 besides the spherical mirrors 135 and 140, one reflecting surface is provided by the diffraction grating itself. Thus, in the diffraction-grating monochromator section too, only three reflecting surfaces, the very minimum possible, are employed. The use of separate collimating mirrors for the incident and diffracted beams renders the grating section superior to one of the so-called auto-collimated Littrow type which employs the same mirror twice. This superiority follows from the fact that scattered radiation from only one beam is produced at a reflecting surface that focuses radiation on a slit.

In any event, it is thus seen that a minimum number of reflecting surfaces are employed in a double monochromator which incorporates the double-W, or compound folded-Z pattern of this invention. As a result, reflection losses are reduced to a minimum, thus producing a high efficiency of transmission through the monochromator in the ultraviolet region. Furthermore, it is well known that the use of Z and folded-Z configurations minimize off-axis spherical aberration and coma.

By arranging the collimating means of the two sections in a folded-Z configuration, off-axis spherical aberration and coma are minimized. By employing a compound folded-Z pattern, as described herein, a compact monochromator is provided in which the terminal slits 102 and 106 are readily accessible for the mounting of a source 10 at one end and a sample comparator 20 at the other end. Furthermore, by virtue of the fact that right-angle bays are provided in the compartment 152 at the terminal slits 102 and 106, it is easy to mount a source unit 10 and a comparison unit 20 without requiring the reflection or refraction of the beam transversely of the terminal path sections 111 and 141.

Furthermore, by employing a folded-Z configuration in each monochromator section, as described herein, the sizes of the monochromatic images of the terminal slits 102 and 106 at the position of the intermediate slit 104 are maintained at a minimum. For this reason, higher resolving power and minimization of the intensity of the scattered radiation are produced than would occur if the collimating means in one section were employed to overcome off-axis spherical aberration and coma introduced by the collimating means of the other section.

It will be understood, of course, that other types of measuring devices than the comparison unit 20 may be employed, and still obtain the advantages of the monochromator. It will also be understood, that radiation may be transmitted through the monochromator in the opposite direction from that specifically described above by employing the terminal slit 106 as the entrance slit and the terminal slit 102 as the exit slit, while still retaining the advantages of the monochromator.

Slit structure and operation

In spectrophotometry it is desirable to maintain the intensity of the monochromatic radiation transmitted to the photocell P through the reference cell $C_R$ of about the same value, irrespective of the variation of wavelength. In this way the amplitude of the signals appearing at the output of the amplifier 42 corresponding to transmission of radiation through the reference sample $C_R$ is kept nearly constant. By setting such constant value in the linear part of the amplification factor of the amplifier 42, that is below the overload point of the amplifier 42, the servo-mechanism (as described hereinafter) that controls the slit width does not become ineffective or sluggish because of lack of response of the amplifier 42.

In the present invention the signals appearing at the output of the amplifier 42 only when radiation is being transmitted to the photocell P through the reference sample $C_R$ are transmitted through a power amplifier 43 to a servo-motor M. A relay 45 is opened by the beam deflector BD periodically only during intervals that radiation is being transmitted through the reference cell $C_R$. Accordingly, voltage pulses are applied to the amplifier 43 in accordance with the deviation of the amplitude of the pulses $P_R$ radiation transmitted through the photocell from a standard value. A voltage comparator (not shown) included in the relay 45 supplies a D.C. voltage to the amplifier 43 in proportion to such deviation. The amplified pulses are applied to the servomotor SM to adjust the widths of the slits 102, 104 and 106 in such a direction as to maintain the amplitude of the reference-sample signals $P_R$ substantially constant.

According to this invention, the slits 102, 104 and 106 are arranged in a common plane so that they may be easily formed by slit jaws carried by a pair of oppositely movable plates as described in more detail hereinafter. Thus, in accordance with the present invention, a simple arrangement is provided for adjusting the width of the terminal slits equally, thereby maintaining maximum resolving power with a monochromator having about unity magnification. Furthermore, with this invention the width of the intermediate slit is also adjusted automatically in unison with the adjustment of the widths of the terminal slits 102 and 106 while maintaining the width of the intermediate slit a fixed amount larger than the width of either terminal slit. In this way, accommodation is provided for some relative displacement of variable nature, or wandering, of images of the terminal slits 102 and 106 of nominal wavelength at the intermediate slit. By accommodating for such wandering, high resolution and low stray light intensity are attained without sacrifice of beam intensity. While the monochromator could be operated with all slits of about the same width, the arrangement described in which the entrance and exit slits are of equal width and the intermediate slit is of slightly greater width, provides high resolving power and a high ratio of intensity of monochromatic radiation to intensity of stray radiation.

Figure 5:
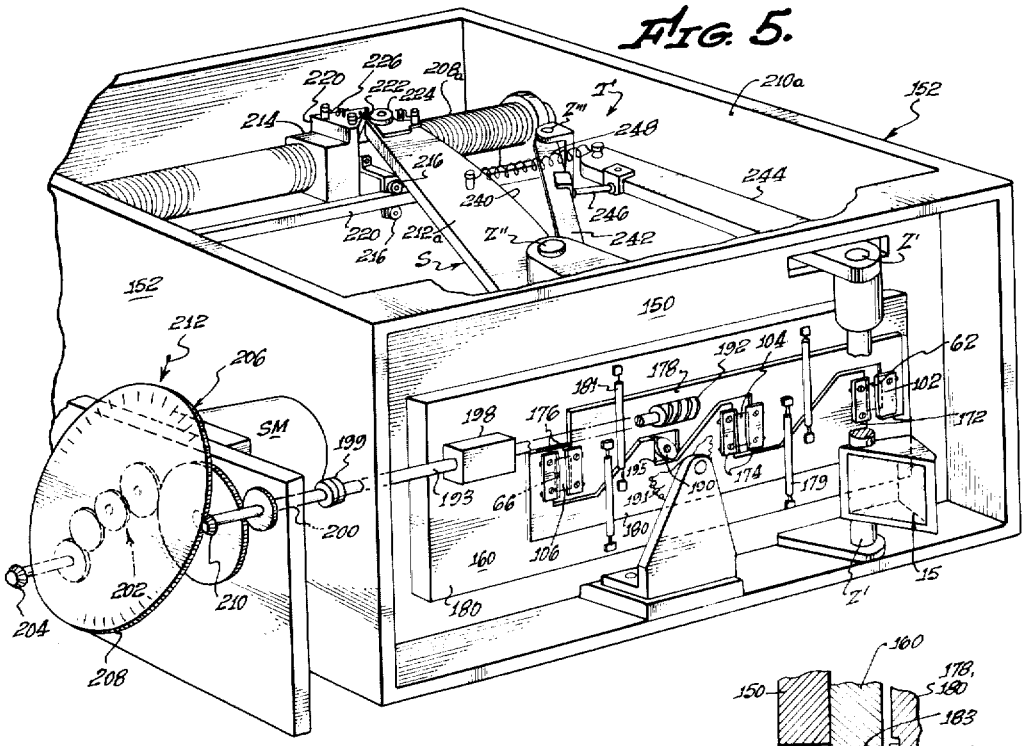
FIG. 5 is a fragmentary perspective view of a monochromator embodying the present invention with the cover removed.
Figure 6:
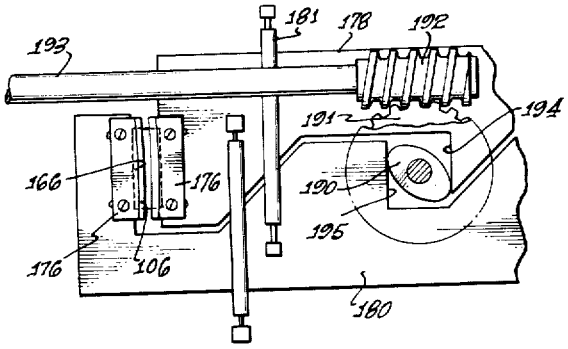
FIG. 6 is an enlarged fragmentary view of a part of the slit control mechanism.

The structure which defines the slits 102, 104 and 106 and the mechanism for adjusting the width of the slits is illustrated in FIG. 5. The slit-defining structure comprises a vertical base plate 160 suitably secured to the partition wall 150 of the monochromator housing 152. The wall 150 and the plate 160 are provided with open windows 162, 164 and 166, as shown particularly in FIG. 1, opposite the slits 102, 104 and 106 respectively. The slits 102, 104 and 106 are established by corresponding pairs of opposing slit-defining jaws 172, 174 and 176. One jaw of each pair is mounted on a movable plate 178, and the other jaw of each pair is mounted on another movable plate 180. As indicated more clearly in FIG. 6, the heights of each of the windows 162, 164 and 166 is less than the heights of the jaws adjacent thereto, the jaws overlapping the windows at both ends, so that, in effect, each slit is defined in a horizontal direction by the slit-defining jaws, and vertically by the top and bottom of the adjacent window. The slits all face in the same direction and lie in the same plane. In practice, a mask having apertures of the required heights may be positioned between the base member 160 and the plates 178 and 180 to define the heights of the slits.

Figure 7:
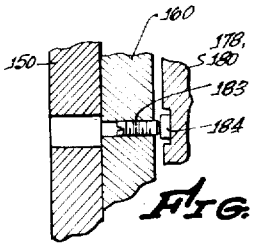
FIG. 7 is a vertical sectional view of a part of the slit supporting mechanism.

The two movable jaw-supporting plates 178 and 180 are mounted in slidable contact with the base plate 160. The sliding contacts are provided by means of bearings including curved sapphire elements 182 adjustably positioned relative to the base member 160 and by means of flat tungsten carbide pads 184 cemented to the movable plates 178 and 180, as indicated in FIG. 7. Flexible hinges 179 connected at one end to the base plate 160 and at the other end to the upper movable plate 178 urge this movable member toward the base plate 160, thereby preserving suitable contact between the bearings and pads associated therewith. Likewise, flexible hinges 181 connected at one end to the base plate 160 and at the other end to the lower movable plate 180 urge this movable member toward the base plate 160, thereby preserving suitable contact between the bearings and pads associated therewith. The flexible hinges 179 and 181 are formed by rigid rods having short resilient wires at these ends. These wires are so biased as to press the pads 184 against the bearings 182. They are also biased to press each pair of slit-defining jaws toward each other. In addition, each pair of flexible hinges 181 and 179, is mounted to provide a parallelogram mounting for its corresponding movable plates 178 and 180 so that as each plate is moved the sets of slit jaws mounted on it are translated without rotation.

The movement of the slit jaws is accomplished by means of an elliptical cam 190 that is rotated about its center about a horizontal axis normal to the plates 178 and 180 by means of a gear 191 driven by a worm 192 carried at the inner end of a shaft 193. Opposite sides of the cam 190 engage opposed vertical bearing surfaces 194 and 195 formed by tungsten carbide pads on the movable plates 178 and 180 respectively. The shaft 193 is supported in a bearing 198, which is rigidly mounted on the base plate 160. The shaft 163 is connected through a flexible coupling 199 to a driving shaft 200. The driving shaft 200 is connected through a gear train 202 to the servo-motor SM and also to a manually rotatable slit-width adjusting knob 204. A dial 206 arranged on an idler bevel gear 208 is operated by a bevel gear 210 at the outer end of the driving shaft 200 to indicate the slit width.

From the foregoing description of the slit-width adjusting mechanism, it will be observed that the width of the slits 102 and 106 are always maintained equal and are the knob 204 or by rotation of the servo-motor SM. In either event the width of the two terminal slits 102 and 106, which are equal, are indicated by the portion of the dial that is opposite a pointer 212. By virtue of the type of bearings employed and the resilient mounting of the movable plates 178 and 180, accurate reproducible settings of the slit widths are obtained and they are correctly and accurately indicated by the dial 206.

The opposing edges of the pairs of slit jaws are in the form of "knife edges," the opposing edges of each pair lying in the same plane Y—Y.

The screws 183 upon which the sapphire bearings 182 are mounted are adjusted in such a way that the slit jaws all move in the same plane.

It is to be noted that each of the movable plates 178 and 180 is provided with four fingers, and that the fingers of the two movable plates are alternately spaced to provide three pairs of opposing elements upon which the slit jaws are mounted and one pair of opposing elements which engage the cam 190.

With this arrangement the widths of the two terminal slits 102 and 106 are always maintatined equal and are varied as necessary to maintain the output of the amplifier 42 substantially constant. At the same time, the width of the intermediate slit 104 is maintained slightly greater than the widths of the two terminal slits 102 and 106, thus assuring high resolving power consistent with satisfactory beam intensity and maintenance of the level of stray light at a low value.

Scanning system

In accordance with this invention, the prism 115 and the grating 138 are rotated together so that they cooperate to scan a spectrum throughout a wide-wavelength range. More particularly, in the specific embodiment of the invention disclosed herein, scanning is accomplished with high resolution of the monochromator throughout the entire transmission band of a fused silica prism. In accomplishing the scanning over the desired wide-wavelength range, the prism 115 and the grating 138 are rotated simultaneously in such a way that the two monochromator sections 110 and 120 always transmit radiation of the same true wavelength at each of the settings. While the rotation of the prism 115 and the grating 138 may be performed by means of separate manually adjustable controls and still obtain the benefits of some features of my invention, in the best mode of carrying out the invention the prism and grating are rotated simultaneously by a single wavelength control device W that operates a mechanical transformer T to maintain the angular positions of the prism and the grating properly coordinated at all times. In the specific embodiment of the invention illustrated, the transformer T is operated through a sine-bar mechanism S, so as to produce indications on a linear wavelength scale or indicator such as a counter 200a.

Figure 9:
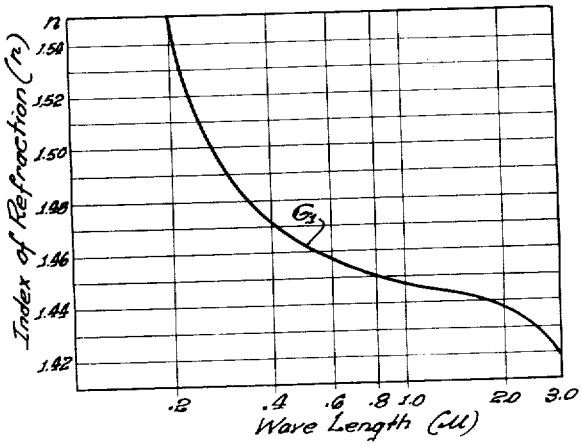
FIG. 9 is a graph of the dispersion curve of the prism.

The fused silica prism employed in the specific embodiment of the invention described herein has an absorption band at a wavelength $\lambda_1$ of about $0.16\mu$ and another absorption band at a wavelength $\lambda_2$ of about $3.5\mu$. A partial absorption band occurs at about $2.8\mu$. Between the two major absorption bands at about $1.6\mu$ and $3.5\mu$ fused silica is transparent in different degrees depending upon the wavelength. In the region in question, the index of refraction n of fused silica varies with wavelength λ somewhat in the manner indicated by the graph $G_1$ of FIG. 9. Referring to graph $G_1$, it will be noted that the dispersion of fused silica is very high at low wavelengths, especially in the ultraviolet region between about 0.2μ and 0.3μ, but that the dispersion is considerably lower in the visible range between about 0.3μ and 0.75μ, and that it is also low in part of the infrared region shown between about 0.75μ and 3.0μ. While there is some inaccuracy in this graph adjacent the partial absorption band at about 2.8μ, compensation for this fact is taken into account by the automatic widening of the slits.

Figure 11:
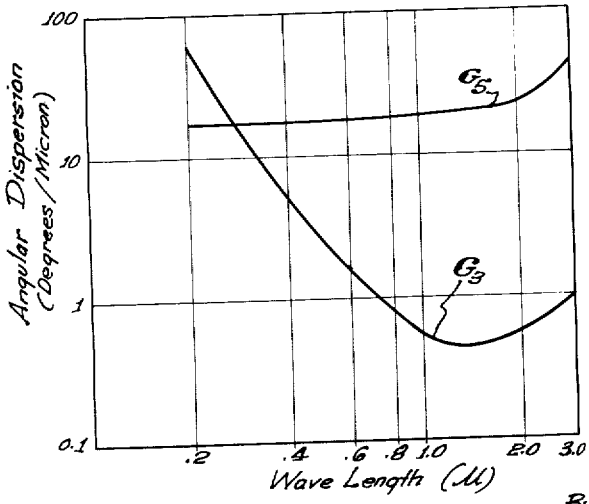
FIG. 11 is a graph representing the angular dispersion of the prism and the grating as a function of wavelength.

In the prism monochromator 110, a prism having an apex angle of 30° has been employed. For this monochromator to transmit radiation having a wavelength of 0.20255μ, the reflecting face 129 is initially set at an angle of about 72° 25′ as indicated in FIG. 1. The angle θ through which the prism must be rotated counterclockwise to vary the wavelength λ of the transmitted monochromatic radiation is indicated by graph $G_2$ of FIG. 10. The correesponding angular dispersion $$\frac{d\theta_1}{d\lambda}$$

of the prism as a function of wavelength λ is indicated by the graph $G_3$ of FIG. 11. As previously indicated, the dispersion is high at short-wavelengths and is low at long wavelengths. It will be noted, particularly from the graph $G_2$ of $\theta_1$ vs. λ, that about 0.3μ the rate at which $\theta_1$ changes with λ begins to level off, so that in this region the resolving power of the prism diminished greatly.

The diffraction grating 138 is of the replica type. In order for it to have a maximum range of operation at high resolving power in its first order spectrum, its grating constant is so selected that the maximum wavelength to appear is slightly above the maximum wavelength which is to be transmitted through the monochromator. To render the efficiency of the monochromator high even when employing a hydrogen discharge lamp to supply the heterogeneous radiation, the "blaze," or angle of the facets of the grating rulings is so established that the normal of the facets bisects the angle between the incident and diffracted rays 137 and 139 when the grating is set to transmit short-wavelength radiation, such as ultraviolet radiation having a wavelength of 0.25μ. The grating 138 employed in the monochromator illustrated has a grating constant of 600 lines/mm. This grating constant corresponds to an upper limit of 3.33μ in the first order spectrum.

The face of the diffraction grating 139 assumes an angle of about 97° for the grating monochromator section 120 to transmit monochromatic radiation of a nominal wavelength of 0.20255μ. The angle through which the diffraction grating must be rotated counterclockwise to vary the wavelength of monochromatic radiation transmitted from the center of the intermediate slit 104 through the center of the exit slit 106 is indicated by graph $G_4$ of FIG. 10 and the manner in which the angular dispersion $$\frac{d\theta_2}{d\lambda}$$

of the grating section 120 varies with wavelength is indicated in graph $G_5$ of FIG. 11. Though the angular dispersion of the diffraction grating does not vary a great deal, at least when compared with the angular dispersion of the prism 115, it will be noted that the angular dispersion of the diffraction grating increases rapidly above about 1.5μ.

A comparison of graphs $G_3$ and $G_5$ of FIG. 11 discloses that the angular dispersion of the prism 115 is greater than the angular dispersion of the diffraction grating below about 0.275μ, and that the angular dispersion of the diffraction grating is greater than the angular dispersion of the prism above about 0.275μ. In the monochromator of this invention, the prism 115 is rotated at a faster rate than the diffraction grating 138 at wavelengths below about 0.275μ, and the diffraction grating is rotated at a faster rate than the prism above about 0.275μ in order that the double monochromator 100 may be highly effective both in a short-wavelength region immediately above the low-wavelength absorption band of the prism but also throughout the remainder of the transmission band of the prism.

In practice, in order to maintain high resolving power of the double monochromator 100, the angle $\theta_1$ of the prism and the angle $\theta_2$ through which the diffraction grating are rotated must be carefully and accurately controlled. Typical values of the prism angle $\theta_1$ and the grating angle $\theta_2$ corresponding to a nominal wavelength λ are listed in Table I.

TABLE I

| Wavelength λ(μ) | Prism Angle $\theta_1$ | Grating Angle $\theta_2$ |
|---|---|---|
| | Degrees | Degrees |
| 0.202550 | 0 | 0 |
| 0.214439 | 0.609 | 0.207 |
| 0.226503 | 1.093 | 0.397 |
| 0.257304 | 1.947 | 0.953 |
| 0.303412 | 2.879 | 1.757 |
| 0.340365 | 3.037 | 2.402 |
| 0.435834 | 3.547 | 4.072 |
| 0.546072 | 3.827 | 6.008 |
| 1.014000 | 4.243 | 14.381 |
| 1.529500 | 4.493 | 24.103 |
| 2.150000 | 4.845 | 37.153 |
| 3.000000 | 5.524 | 61.904 |

According to this invention, a mechanical transformer T is provided in which the required relationship between the positions of the prism 115 and the positions of the diffraction grating 138 are correctly related and automatically established at all wavelengths of the spectrum between the limits of the instrument. The transformer in question is so designed as to render it compact and to render it subject to machining within reasonable, though strict, tolerances and at the same time to provide adequate leverage for rotating the prism by applying power to a device which rotates the diffraction grating more or less directly but before power is applied to rotate the prism.

Figure 8:
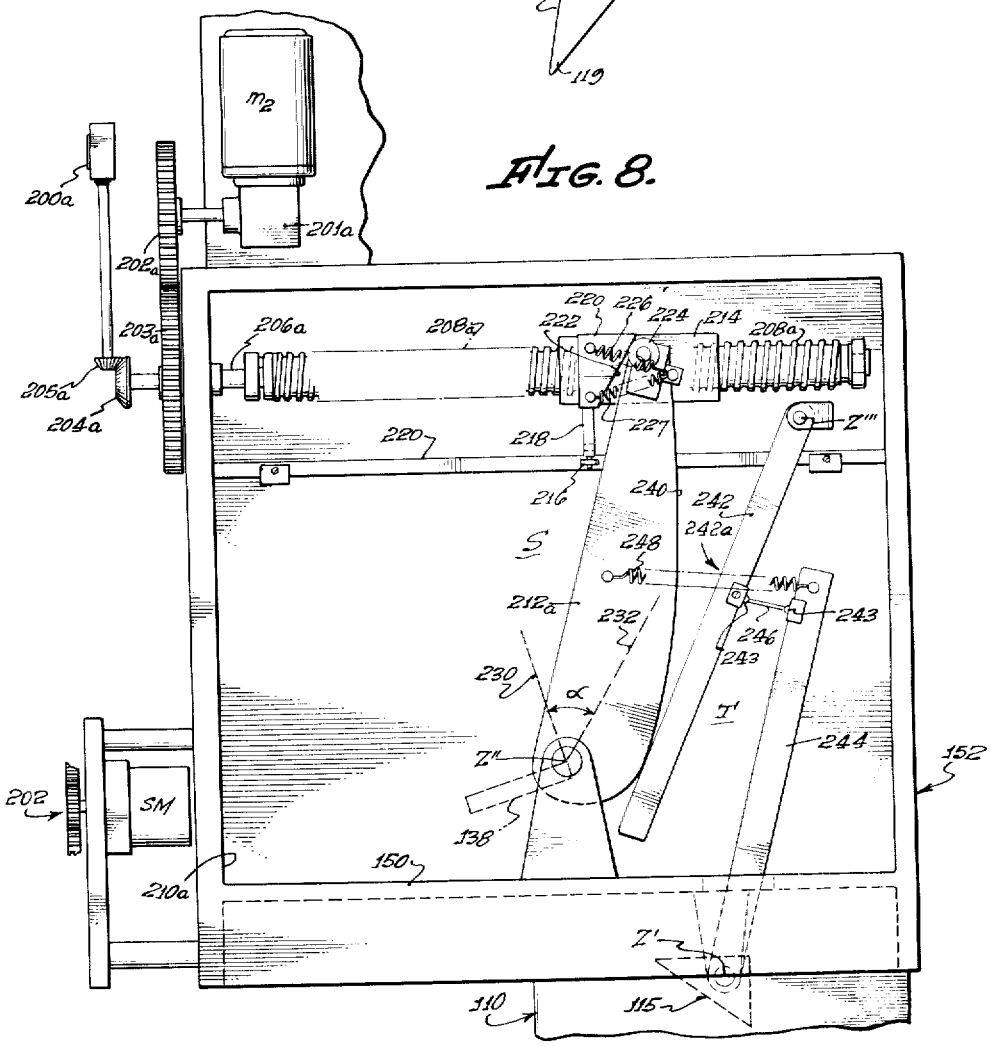
FIG. 8 is a plan view of the monochromator.
Figure 4:
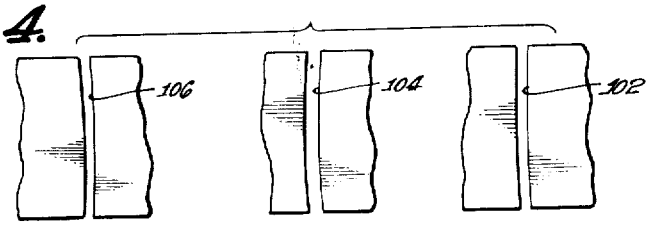
FIG. 4 is an elevational view showing the shapes of the slits.

Referring particularly to FIGS. 5 and 8, a motor $m_2$ which forms part of the wavelength control unit W of FIG. 1 is employed to vary the wavelength and to operate the counter 200a through a gear train including the speed reducer 201a, spur gears 202a and 203a and bevel gears 204a and 205a. The driven spur gear 203a and the driving bevel gear 204a are mounted on the end of a shaft 206a, which carries a lead screw 208a that extends horizontally substantially all the way across the housing 152 parallel to the plane Y—Y. The shaft 206a is mounted in a compartment 210 arranged above the monochromator and is restrained by any suitable kind of bearing against longitudinal movement along its axis. The lead screw 208a and a pivoted driven grating bar, or sine-bar 212a, which is attached to the diffraction grating, comprise parts of the driving sine-bar mechanism. By means of this mechanism the diffraction grating 138 is rotated in such a way that changes in the indication of the counter 200a are proportional to changes in the wavelength transmitted through the diffraction monochromator 120. By choice of suitable lead screw pitch, sine-bar length, and gear ratios the counter is made to indicate the wavelength λ directly in microns (μ).

The sine-bar mechanism also includes an elongated threaded nut 214 engaging the lead screw 208a and restrained against rotation by means of rollers 216 that are mounted on the outer end of a stabilizing bar 218 and are arranged on opposite sides of a transverse stabilizing rail 219 parallel to the shaft 206a. A trapezoidal guide plate 220 having an inclined face 222 is mounted on the upper side of the nut 214. The sine-bar 212a is provided with a guide roller (not shown) to permit it to rest upon the upper side of the nut 214 and to be moved relatively thereto without excessive friction or binding. A roller 224 mounted to rotate about a vertical axis at the outer end of the sine-bar 212a engages the inclined face 222 of the guide plate 220 and is drawn toward that face to assure good contact therewith by means of a pair of coil springs 226 and 227.

It can be shown that the wavelength of the radiation transmitted by the diffraction-grating section 130 is given by the following formula $$\lambda=\frac{2}{N}\cos\theta_2\sin\alpha \qquad (1)$$

where $\theta_2$=angle between incident path section 137 and diffracted path section 139 (see FIG. 1);

$\alpha$=angle between normal to diffraction grating indicated by the number 230 in FIG. 8, and a line 232 along which the normal lies when $\lambda=0$.

By arranging the face 222 of the guide plate 220 parallel to the line 232, the correct desired relationship between the position of the nut 214 on the lead screw 208a and the position of the diffraction grating 138 is established in accordance with Formula 1 above regardless of the distance from the lead screw 208a to the axis Y—Y. The sine-bar mechanism S thus maintains a linear relationship between the angle of rotation of the lead screw or displacement of the nut 214 and the wavelength of the monochromatic radiation transmitted through the diffraction grating section 120.

The mechanical transformer T between the diffraction grating 138 and the prism 115 is provided by a cam face 240 formed on one side of the sine or grating bar 212a and a three-bar linkage including a follower bar 242, which is pivoted about an axis Z''' adjacent the lead screw 284, a prism bar 244 secured to rotate the prism 115 about its pivot axis Z', and a short interconnecting link 246 pivotally connected at one end at a point between the ends of the first pivoted arm 242 and at the other at a point near the outer end of the second pivoted arm 244. In practice, the interconnecting link consists of a rigid rod having hemispherical ends which are located within hemispherical sockets 243 mounted on or formed in the pivot arms 242 and 244. The centers of the hemispheres are the effective pivot points. One end of a tension coil spring 248 is connected to a point intermediate the ends of the grating bar 212, and the other end of the spring is connected to the outer end of the prism bar 244. The spring 248 urges the first rotatable arm 242 into firm contact with the cam face 240 and restrains the pivoted link, so as to remove back lash and render the angular setting of the prism for each setting of the grating accurately reproducible.

The exact shape of the cam face 240 depends upon a large number of factors, including the effective lengths of the bars 242 and 244, the positions of their axes of rotation, their widths and the effective length of the link 246, the grating constant N, the angle $\theta_2$ between the incident and diffracted rays 137 between the incident and diffracted rays 137 and 139, the angle $\theta_1$ between the incident and refracted rays 114 and 121, the angle of the prism 115, and especially upon the dispersion characteristics of the particular material employed in the prism 115. In any event, these various factors and the dimensions and positions of the arms 242 and 244, and the shape of the cam face 240 may be selected in a wide number of ways, as will now be apparent to those skilled in the art.

Figure 10:
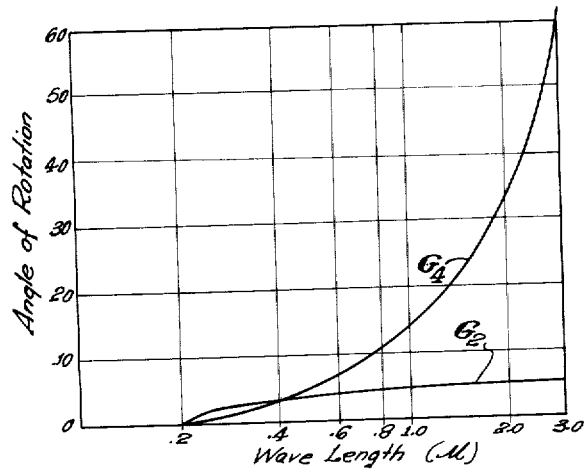
FIG. 10 is a graph showing how the angular positions of the prism and the diffraction grating vary with wavelength.
Figure 12:
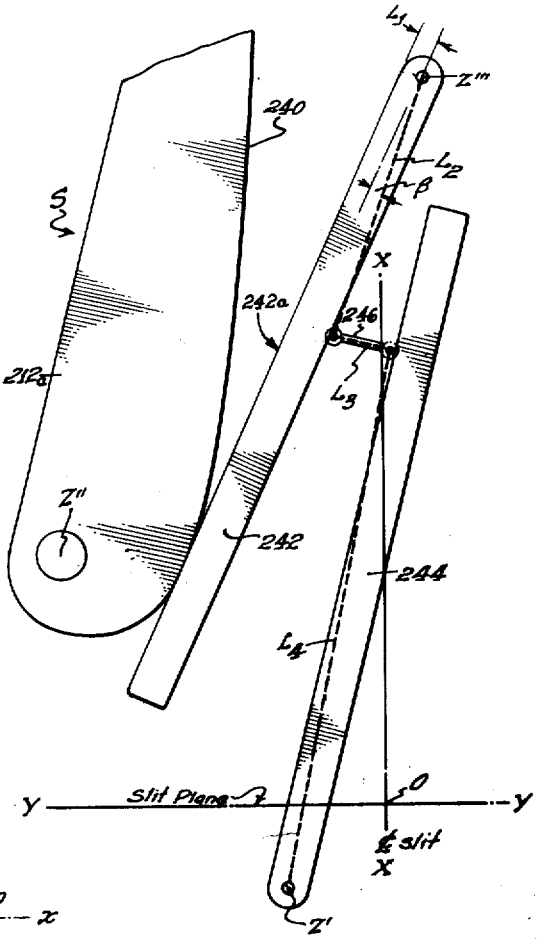
FIG. 12 is a diagrammatic view of the transformer interconnecting the prism and the grating.

A transformer T of specific design suitable for use in the present invention is illustrated in FIG. 12, where the relative positions, sizes and shapes of the elements of the transformer are shown. As indicated there, the axes or rotation Z', Z'' and Z''' of the prism bar 244, the sine bar or grating bar 212, and the follower cam bar 242, are located at the positions (1.25, —1.47), (—3.88, —4.90), and (—11.14, 0.72). The cam-engaging face 242a of the follower cam bar 242 is offset from the pivot axis Z''' of the follower cam bar 242 by a distance $L_1=0.34''$. The effective length of the follower cam bar when considered as a lever of the linkage is $L_2=4.21''$, and the pivot point between the follower arm 242 and the connecting link 246 lies in a direction counter-clockwise from the center line of the follower bar by an angle of about $\beta=5°$. The length of the interconnecting link 246 is $L_3=0.95''$ and the effective length of the prism arm 244 between its axis Z' of rotation and the point at which it is pivotally connected to the interconnected link 246 is $L_4=8.39''$. Knowing such factors, including the corresponding positions at which the prism 115 and the diffraction grating 138 must be set at different wavelengths, as indicated by the graphs of FIG. 10 or by the table above, it is obvious that the contours of the cam elements 240 and 242 may be designed by the application of elementary principles of geometry and trigonometry.

Figure 13:
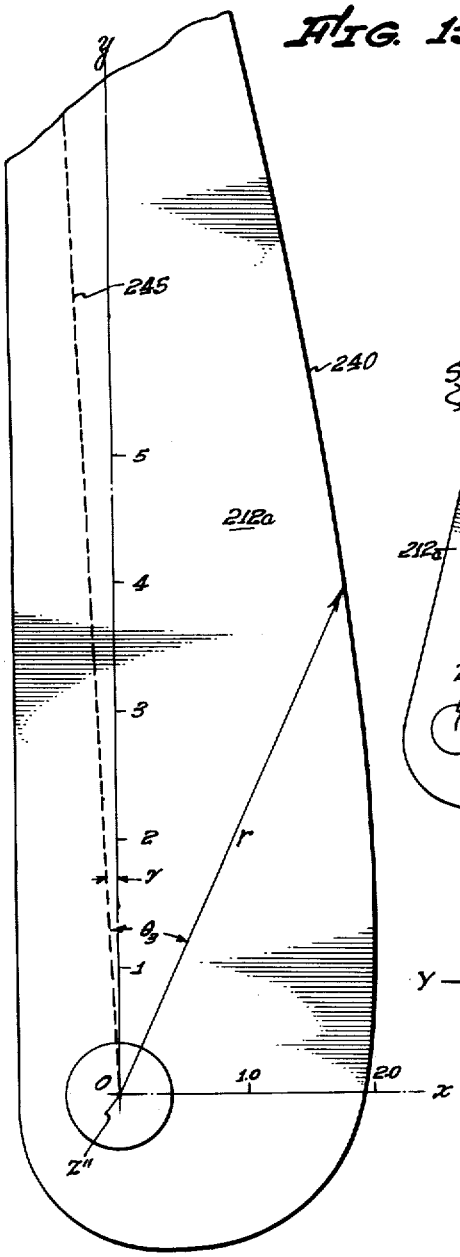
FIG. 13 is a plan view of the driving cam arm.

In designing the particular cam shown in FIGS. 5, 8, 12 and 13, a flat surface was chosen for the cam face 242a of the follower cam bar 242, a cam radius of about 1½" was chosen for the long-wavelength limit of 3.0$\mu$, for which the monochromator was designed to operate. From this factor and the others already determined, the exact shape of the cam is established. The profile of such a cam is shown in FIG. 13. In this figure which is drawn to scale, the shape of the cam profile is indicated on an x—y coordinate system, having its origin O at the axis Z''. The value of the abscissae and ordinates are set forth in inches. The line 245 joining the axis of rotation Z'' with the center of the roller 224 forms an angle $\gamma$ with the y axis, where $\sin\gamma=3/80$. The positions of various points on the cam face 240 may also be described in terms of polar coordinates. In the following table, the positions of typical points are expressed in terms of radial distance r to the point and the angle $\theta_3$ which is between the radius and the reference line 245:

TABLE II

| $\theta_3$: | r |
|---|---|
| 10 | 8.14 |
| 15 | 6.56 |
| 20 | 5.41 |
| 25 | 4.53 |
| 35 | 3.50 |
| 45 | 2.91 |
| 65 | 2.27 |
| 85 | 2.00 |
| 105 | 1.81 |
| 135 | 1.56 |

It will be understood, of course, that the links of the various parts of the transformer T and the positions of the axes of rotation Z', Z'' and Z''' may be altered by any constant proportion. In other words, the dimensions and lengths specified for the parts of the transformer T need not be in terms of inches, but may be constructed in terms of any arbitrary unit.

The specific type of transformer employed has a large number of desirable characteristics which render it particularly adaptable for use in a double monochromator employing a prism monochromator section and a diffraction monochromator section. The most important characteristic of this transformer lies in the fact that the rate of rotation of the prism with respect to the rate of rotation of the diffraction grating as defined by the formula $$\frac{d\theta_1}{d\theta_2}=\left(\frac{d\theta_1/d\lambda}{d\theta_2/d\lambda}\right)$$

may be made large at short-wavelengths and small at long-wavelengths. More particularly, it is to be noted, that the rate of rotation of the prism is greater than the rate of rotation of the diffraction grating at short-wavelengths below an intermediate wavelength $\lambda_3$ of about 0.275$\mu$; that the rates of rotation are equal at about this intermediate wavelength, and that the rate of rotation of the diffraction grating is large compared to the rate of rotation of the prism at wavelengths greater than this intermediate wavelength. With this arrangement the double monochromator is readily adjusted to transmit both short-wavelengths in the region in which the prism has the greater dispersing power and at long-wavelengths in which the diffraction grating has the greater dispersing power, as well as at intermediate wavelengths. At the same time, because of the fact that a linear wavelength scale is provided, once the instrument is adjusted the wavelength transmitted by the double monochromator is easily ascertained by reading the indication of the counter 200a.

The cam face 240 is in the form of a somewhat spiral curve and has a relatively large radius of curvature at points corresponding to short-wavelength settings, and a relatively small radius of curvature at points corresponding to relatively long-wavelength settings. At the relatively short wavelengths, a given wavelength increment produces a relatively large rotation of the follower arm 242, but at relatively long wavelengths, the same increment in wavelength produces only a relatively small rotation of the follower arm 242.

A transformer of the type described herein is particularly suitable to employ because the cam lift of the cams and the multiplying factor of the linkage vary together, both being small in the long-wavelength region where the prism is to be rotated at a much slower rate than the diffraction grating and both being large in the ultraviolet region where the prism is to be rotated at a much higher rate than the diffraction grating. In this particular case, the term "cam lift" refers to the linear displacement of a point on the follower bar 212 at the point of contact with the driving cam profile that occurs for rotation of the grating bar through an angle of 1°. It is to be noted that the point of tangency shifts gradually during the scanning, being at a long radius from the axis Z″ at short-wavelengths and a short radius from that axis at long-wavelengths. The desired relationship between cam lift and multiplying factor are attained partly by virtue of the fact that the cam bar 212a and the prism bar 244 extend in the same direction while the follower bar 242 extends in the opposite direction and between them, and partly by virtue of the fact that the pivot point between follower bar 212a and the interconnecting link 246 lie opposite the cam profile between the ends of the cam and in the neighborhood of the wavelength at which the angular dispersion of the prism and the diffraction grating are about the same.

Figure 15:
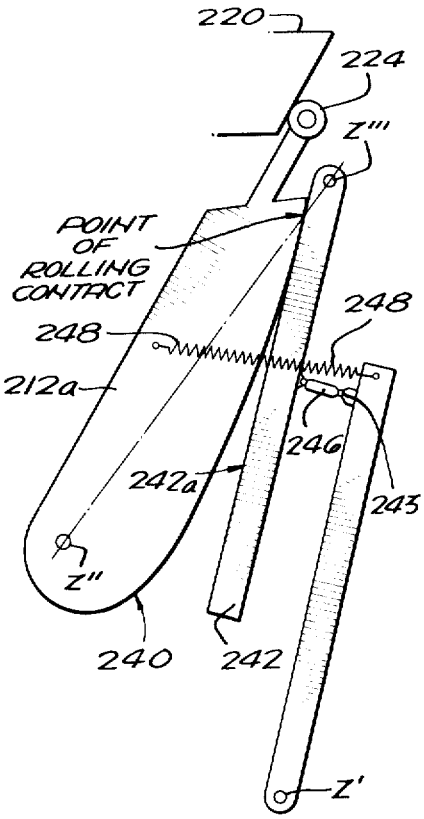
FIG. 15 is a view similar to that of FIG. 12 showing a different operating position of the parts.

It is to be noted that in the specific arrangement described a rolling contact occurs between the cam surface 240 and the follower bar 242 in the short-wave length range where maximum loading between the cam surface and the bar occurs. This is illustrated in FIG. 15 and is achieved in part by so designing the transformer that at a wavelength in the low-wavelength range, the cam face 240 and the cam surface 242a of the follower bar 242 make a contact on the line joining the axes Z″ and Z‴. This position determines the offset of the cam surface 242a from the axis of rotation Z‴ of the follower bar 242. In practice, the cam is laid out on paper to be certain that it is of workable shape. It is then calculated more exactly. Then a cam is cut and its surface highly polished, being gradually worked and smoothed to attain a high degree of accuracy in the correspondence between the nominal wavelength of the prism monochromator section 110 and the diffraction monochromator section 120.

By constructing the cam surface 240 and 242a accurately, it is possible to bring the monochromatic images of the two terminal slits 102 and 106 to foci which are substantially in coincidence near the center of the intermediate slit 104. By maintaining the close proximation of these images to each other, and to the center of the intermediate slit throughout the entire wavelength range, for which the instrument is designed to be used, the intermediate slit may be made very narrow and only slightly wider than each of the two terminal slits. As a result, the amount of scattered radiation transmitted through the monochromator is maintained at a minimum, while still preserving a high resolving power. In the particular embodiment of the invention illustrated herein, each of the monochromatic images of the respective terminal slits was maintained within about 0.005″ of the center of the intermediate slit, except in the neighborhood of the partial absorption band at 2.8$\mu$ where as indicated previously the index of refraction curve is somewhat erratic. As a result, by employing an intermediate slit that had a width of only 0.01″ wider than either of the terminal slits 102 or 106, the desired high resolving power with low scattering is obtained between about 0.2$\mu$ to about 3.0$\mu$ except at about 2.8$\mu$.

It will be noted that if the positions of the monochromatic images of the entrance slit 102 and exit slit 106 at the intermediate slit 104 are displaced substantially from the center of the intermediate slit, such as occurs for example in the neighborhood of the partial absorption band at 2.8$\mu$, very little radiation can be transmitted through the monochromator unless the width of the intermediate slit is increased. In the spectrophotometer described, this increase occurs automatically during the scanning. It will be noted, however, that an increase would also occur because of the fact that the intensity of the radiation transmitted through the prism section is also reduced in the neighborhood of the absorption band. It is thus apparent that by automatically regulating the width of the slits as hereinbefore described, the winding of the slits in the neighborhood of an intermediate absorption band such as that occurring at 2.8$\mu$ not only compensates for the reduction of intensity of radiation transmitted through the prism monochromator section, but also tends to compensate for deviations of the index of refraction from the smooth curve $G_1$ shown in FIG. 9, and the smooth angular dispersion curve $G_2$ shown in FIG. 10.

Figure 14:
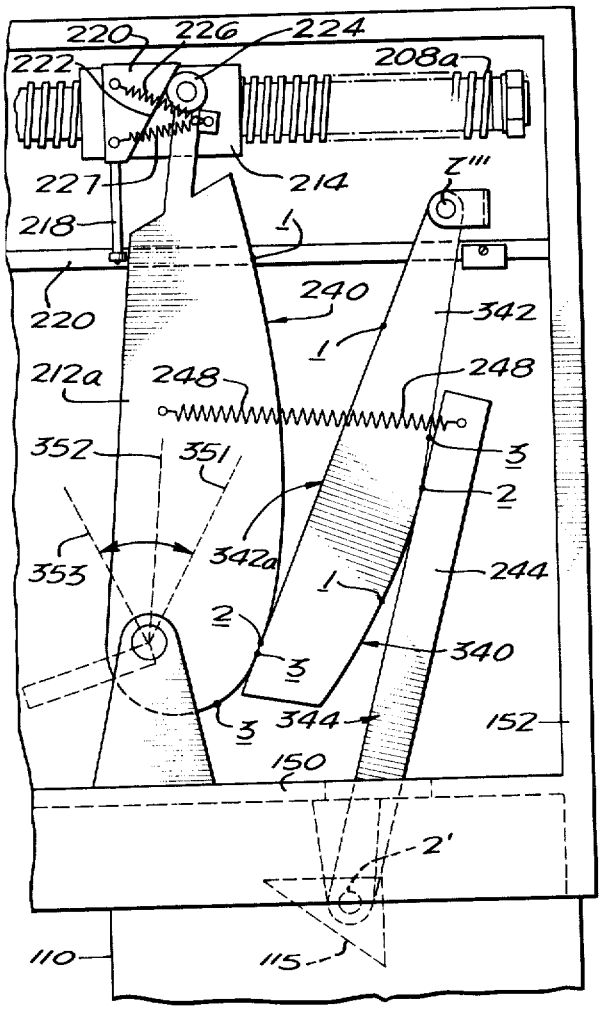
FIG. 14 is a diagrammatic view of a modified form of the interconnecting transformer of FIG. 12.

In FIG. 14, there is illustrated a modified form of the transformer shown in FIG. 8 and FIG. 12. In this form, the straight follower bar 242 is replaced by a follower cam bar 342 which has on one side a straight edge cam face 342a corresponding with the cam face 242a and a cam lobe or curved cam face 340 on the opposite edge similar to the cam lobe or cam face 240 of the sine-bar or grating bar 212a. Thus, a double-cam structure is provided by the cam lobe faces 240 and 340, with the result that the connecting link 246 of FIGS. 5, 8, 12 and 15 is eliminated. The spring 248 is relied upon as before to maintain the contacts and insure proper following action.

The cam elements 342 and 244 of FIG. 14 effect substantially the same multiplying action the linkage above described for the structure of FIGS. 8 and 12. Additionally the structure of FIG. 14 effects a rolling action between the cam face 340 and the adjacent cooperating cam face 344 of the pivoted prism-actuating bar or arm 244 at a point of the operation. At the same time, the rolling contact between the cam surface 240 and the straight cam face or cam edge 342a is maintained as in the arrangement illustrated in FIG. 15 and described in connection with the cam face 240 and the cam face 242a.

With respect to these various cam face contacts, the full line position of FIG. 14 shows the relationship for an intermediate position which represents a wavelength of about 15,000 A. The broken axis line 351 indicates a position representing a short wavelength of about 2000 A., for example, where the broken axis line 352 represents the mentioned intermediate position. The broken axis line 353 indicates a position representing a long wavelength of about 30,000 A., for example.

These axis lines 351, 352 and 353 may be considered respectively as representing positions 1, 2 and 3, and for further exemplification, corresponding contact points of the parts at such positions are indicated in FIG. 14 by the reference numerals 1, 2 and 3, respectively.

Conclusion

From the foregoing detailed description, it is clear that a monochromator has been provided which is useful over a wide wavelength range and which is characterized by high resolving power and low intensity of scattered radiation. Furthermore, in the specific embodiment of the invention illustrated, which is designed for use over a range of wavelengths extending from a point in the ultraviolet region to a point in the near infrared region, advantage is taken of the fact that a prism possesses a higher dispersion and a higher resolving power than a grating at short-wavelengths and that a grating has higher dispersion and better resolving power at long-wavelengths. By means of the present invention, a double monochromator is provided which takes advantage of the superiority of both a prism and a grating in the respective wavelength ranges in which each is superior to the other.

In the double monochromator described, the prism provides most of the dispersion for resolving short-wavelength components of the radiation and acts as a narrow-band order sorter at long-wavelengths where the grating has high resolving power. Also, in this double monochromator the grating provides most of the dispersion for resolving long-wavelength components of the radiation. At long-wavelengths the prism reduces the amount of scattered radiation that would otherwise appear in the emerging monochromatic radiation if only the grating monochromator section were employed. At short-wavelengths the grating reduces the amount of scattered radiation that would otherwise appear in the emerging monochromatic radiation if only the prism monochromator section were employed.

In this invention, the effectiveness of both a prism and a grating are attained in a single instrument by employing a double monochromator in which the three slits have about the same widths and in which a mechanical transformer is employed to accurately set the angular position of the prism and the grating to transmit radiation of the same wavelength over a fixed path extending through one terminal slit, through an intermediate slit, and then through the other terminal slit. Furthermore, by employing an optical arrangement having a folded-Z configuration, both in the prism section and in the grating section, a maximum resolving power is obtained. Furthermore, by virtue of the employment of the folded-Z configuration, a minimum number of reflecting surfaces is utilized, thus minimizing reflection losses, especially in the ultraviolet region where high transmission efficiency is needed in the monochromator because of the relatively low intensity of ultraviolet sources that are generally available. In the folded-Z arrangement described herein, the jaws defining the three slits are arranged to be moved in parallel planes, thus making it easy to maintain a fixed relationship between their widths.

Furthermore, in accordance with this invention, a transformer is provided which makes possible rotating the grating and the prism at widely different rates in different parts of the spectrum. In the specific arrangement provided, the transformer action is attained in a mechanism which is relatively free of danger of jamming and is not subject to excessive friction. The effectiveness of this specific transformer is achieved in an arrangement in which the cam lift varies continuously throughout the spectrum at the same time that the multiplication factor of a cooperating linkage varies continuously throughout the spectrum in such a way that their effects are multiplied, each thus reducing the labor that must be performed by the other.

In the description, reference has been made to lower and upper-wavelength limits $\lambda_1$ and $\lambda_2$ of the transmission band of a prism and reference has also been made to the upper-wavelength limit $\lambda_2$ of the diffraction grating. It will be understood, of course, that in practice the spectrophotometer need not be effective throughout the entire transmission band of the prism, and that the lower and upper-wavelength limits of the spectrophotometer will not necessarily be the same as the lower and upper limits of transmission of the prism. Furthermore, as is apparent from the foregoing description, the range of the monochromator may even overlap an absorption band of the prism, particularly if the absorption band in question is not a very strong one. It is therefore apparent that as a matter of convenience, if $\lambda_1$ and $\lambda_2$ represent wavelengths between which the prism transmits radiation even though it also transmits radiation outside these limits and absorbs radiation between these limits, the general relationships hereinbefore described will apply. But in any event the important characteristic of the double monochromator described lies in the fact that the dispersion of one of the dispersing elements is higher than the other in one wavelength range and that the reverse is true in a second wavelength range and that their motions are coordinated to give high dispersion throughout both ranges.

From the foregoing description, it will be apparent that this invention may be applied in many other ways than that specifically described herein, and that it may be applied to monochromators which operate over wavelength ranges other than that referred to particularly herein. While the invention has been exemplified by only one specific embodiment, it will therefore be obvious that the invention is not limited thereto, but is capable of being embodied in many other forms. Various changes which will now suggest themselves to those skilled in the art may be made in the material, form details of construction and arrangement of the elements without departing from the invention. Reference is therefore made to the appended claims to ascertain the scope of the invention.

The invention claimed is:

1. A monochromator including:

combined supporting and housing structure provided with a separating wall portion and two terminal-slit wall portions, said separating wall portion being provided with a light-transmitting aperture;

two monochromator sections arranged on said combined supporting and housing [means] *structure*, said two monochromator sections being contiguous at said separating wall portion, each section having a terminal slit in a corresponding one of said terminal-slit wall portions and containing a dispersing element and a pair of collimating mirrors arranged in a folded-Z configuration, whereby radiation passing through one terminal slit is transmitted by said mirrors and dispersing elements through the two monochromator sections in succession and emerges through the other terminal slit, the path of transmission in each monochromator section being of folded-Z configuration, radiation being deflated along each such path only by the dispersing element and the collimating mirrors of the respective sections, the legs of the respective folded-Z path being straight and being free from light-deflecting reflection surfaces, the legs of the respective folded-Z configurations that are optically remote from the corresponding terminal slit being collinear and extending through said *light-transmitting* aperture, said terminal slits being defined at spaced-*apart* portions of said [separating] *terminal-slit* wall [means] *portions*;

and means including a narrow aperture located at the junction of said collinear legs and larger than the monochromatic image of either terminal slit at said junction for reducing the amount of stray radiation transmitted through one monochromator section to the other, said narrow aperture constituting substantially the sole region for transmission of radiation from either of said monochromator sections to the other.

2. A monochromator as defined in claim 1, wherein the width of each of said slits is about equal to the width of a monochromatic image of the other formed at the position of said each slit; *and* means for coordinately moving said dispersing elements, whereby monochromatic images of the corresponding terminal slits and of the same wavelength may be formed at two points adjacent the junction between said collinear legs;

[means including an] *said narrow* aperture located at said junction [and] overlapping the widths of such two monochromatic images for transmitting monochromatic radiation from one terminal slit to the other through said monochromator sections in succession and for reducing the amount of stray radiation transmitted through the monochromator sections.

3. In a monochromator having a first monochromator section and a second monochromator section arranged in cascade between two terminal slits, said first monochromator section comprising a dispersing prism and said second monochromator section comprising a dispersing diffraction grating:

means for rotating said diffraction grating to vary the selected wavelength of radiation transmittable through the diffraction-grating monochromator section;

a transformer interconnecting said diffraction grating and said prism, said transformer including a pair of rotatable cam elements, one of which rotates with the diffraction grating, said cam elements having a cam lift action that varies continuously throughout the spectrum including a low-lift cam action in a long-wavelength region and a high-lift cam action in a short-wavelength region; and a multiplying mechanism interconnecting the other cam element and said prism, said multiplying mechanism having a multiplying action that varies continuously throughout the spectrum, the effective multiplication factor being less than 1 in said long-wavelength region and more than 1 in said short-wavelength region.

4. In a monochromator having a first monochromator section and a second monochromator section arranged in cascade between two terminal slits, said first monochromator section comprising a dispersing prism and said second monochromator section comprising a dispersing diffraction grating:

a sine-bar mechanism for rotating said diffraction grating through an angle the sine of which is proportional to the displacement of a driving element, said sine-bar mechanism including a rotatable sine-bar on which said diffraction grating is mounted, said sine-bar having a spiral cam thereon;

a three-arm linkage including a first pivoted arm connected to said prism, a pivotally mounted follower arm and an interconnecting link; and means for causing said follower arm to remain engaged with said spiral cam throughout the scanning, the shape of said cam and said follower arm, and the position and lengths of said arms and the length of said link being so related to the characteristics of said prism and said grating and the optics of said monochromator sections that monochromatic radiation is transmitted through said monochromator throughout a spectral region including a part in which the angular dispersion of the prism is greater than the angular dispersion of the diffraction grating and another part in which the angular dispersion of the diffraction grating is greater than the angular dispersion of the prism.

5. A monochromator including:

a prism section and a grating section arranged in succession between two terminal slits, said prism section comprising a fused silica prism, having an effective refraction angle of 60°, said diffraction grating having a grating spacing that is substantially an integral multiple of about $1\frac{2}{3}\mu$;

means for transmitting monochromatic radiation along a path extending from one terminal slit to the prism and from there by refraction to the diffraction grating and from there to the other terminal slit, the angle of deviation between the incident and refracted ray paths at the prism being about 9° 30′, the angle of deviation between the incident and diffracted paths at the grating being about 16° 30′;

a transformer for mechanically rotating said prism and said grating simultaneously about parallel axes in such a way that their dispersions add so as to vary the wavelength of said monochromatic radiation, said transformer including a driving cam bar for rotating the diffraction grating, a follower cam bar, and a prism bar for rotating the prism;

a link interconnecting the follower cam bar and the prism bar, the follower cam bar having a straight cam face engaging the cam face of said driving cam bar, said follower cam face being displaced from the axis of rotation of the follower cam bar by a distance of 0.34 toward the driving cam bar and being displaced from the axis of rotation of the follower cam bar and the pivot axis between the follower cam bar and the interconnecting link by an angle of about 5°, the axes of rotation of the prism bar, the follower cam bar and the driving cam bar being at about (+1.35, −1.47), (−11.14, +0.72), and (−3.88, −4.90) respectively, said driving cam bar having a spiral cam face thereon, said spiral cam face being defined by a smooth curve intersecting points defined by the following table:

| θ: | r |
|---|---|
| 10 | 8.14 |
| 15 | 6.56 |
| 20 | 5.41 |
| 25 | 4.53 |
| 35 | 3.50 |
| 45 | 2.91 |
| 65 | 2.27 |
| 85 | 2.00 |
| 105 | 1.81 |
| 135 | 1.56 |

where the positions of the points relative to the axis of rotation of said follower cam bar are defined by polar coordinates θ and r, the effective lengths of the prism bar, the follower cam bar and the interconnecting link being respectively about 8.39, 4.21, and 0.95, the positions and the lengths being in arbitrary units and in a Cartesian co-ordinate system having an origin at the axis of rotation of the driving cam bar.

6. In a monochromator having a first monochromator section and a second monochromator section arranged in casade between two terminal slits, said first monochromator section comprising a dispersing prism and said second monochromator section comprising a dispersing diffraction grating:

means for rotating said diffraction grating to vary the selected wavelength of radiation transmittable through the diffraction-grating monochromator section:

a transformer interconnected said diffraction grating and said prism, said transformer including a pair of rotatable cam elements, one of which rotates with the diffraction grating, said cam elements having a cam lift action that varies continuously throughout the spectrum including a low-lift cam action in a long-wavelength region and a high-lift cam action in a short-wavelength; and a multiplying mechanism interconnecting the other cam element and said prism, said multiplying mechanism having a multiplying action that varies continuously throughout the spectrum, the effective multiplication factor being smaller in said long-wavelength region than it is in said short-wavelength region.

7. In a double monochromator:

a prism-monochromator section including a dispersing prism element;

a grating-monochromator section including a dispersing diffraction-grating element;

a sine bar cam mechanism comprising a pivotal sine bar carrying said diffraction grating element, said sine bar having a cam surface formed thereon, said sine bar cam mechanism also comprising a cam follower pivoted remotely from the pivot axis of said sine bar, said cam follower engaging the cam surface of said sine bar, said cam mechanism having a cam region of high lift when short wavelength radiation is being transmitted through said double monochromator and having a cam region of low lift when long wavelength radiation is being transmitted through said monochromator;

means for rotating said sine bar, thereby also rotating said cam follower; and a pivoted drive arm for rotating said prism, said drive arm being linked to said cam follower by a linkage;

said sine bar cam mechanism, said cam follower, and said prism drive arm being operatively connected to effect a high multiplying action throughout the region of said short wavelength radiation and a low multiplying action throughout the region of said long wavelength radiation.

8. A monochromator as in claim 7, wherein said cam follower provides a rolling contact in said high-lift region.

9. A monochromator as in claim 8, wherein said cam follower provides high-lift and low-lift regions and rolling contact with said prism drive arm in its high-lift region.

10. A monochromator as in claim 7, wherein the ratio of rates of rotation of the prism to the grating vary through a range of about 100 to 1 in scanning from the short-wavelength limit $\lambda_1$ to the long-wavelength limit $\lambda_2$.

11. In a monochromator having a first monochromator section and a second monochromator section arranged in cascade between two terminal-slits, said first monochromator section comprising a dispersing prism and said second monochromtaor section comprising a dispersing diffraction grating:

means for rotating said diffraction grating to vary the selected wavelength of radiation transmittable through the diffraction grating monochromator section;

a motion transformer interconnecting said diffraction grating and said prism, said transformer including a pair of rotatable cam elements, one of which rotates with the diffraction grating, said cam elements having a cam lift action that varies continuously throughout the spectrum including a low-lift cam action in a long wavelength region and a high-lift cam action in a short wavelength region;

optical means located in the respective monochromator sections for focusing a monochromatic image of one of said terminal-slits at the position of the other terminal-slit whereby the image of the first terminal-slit formed at the second terminal-slit about the same width as the latter slit; and a multiplying mechanism interconnecting the other cam element and said prism, said multiplying mechanism having a multiplying action that varies continuously throughout the spectrum.

12. A monochromator as defined in claim 11 wherein one of the rotatable cam elements of said transformer comprises a pivoted sine bar on which said diffraction grating is mounted, said sine bar rotating said diffraction grating through an angle having a sine that is proportional to the displacement of a driving element, said sine bar having a spiral cam thereon;

and wherein said prism has a transmission band that extends from a short wavelength limit $\lambda_1$ to a long wavelength $\lambda_2$, said diffraction grating having a grating spacing equal to an integral multiple of about ½ of $\lambda_2$;

said transformer rotating said diffraction grating and said prism simultaneously to scan a spectrum that extends from said short wavelength limit $\lambda_1$ to said long wavelength limit $\lambda_2$ so as to transmit monochromatic radiation of variable wavelength between said limits through both said monochromator sections, said transformer being characterized by rotating the prism faster than said diffraction grating in the short wavelength part of said band and slower than said diffraction grating in the long wavelength part of said band; and means including a lead screw driven by said driving element and carrying a nut at a point remote from the pivot axis of said sine bar for rotating said sine bar about its axis; and auxiliary means moved in synchronism with the rotation of said lead screw for indicating on a linear scale the wavelength of the monochromatic radiation being transmitted at any one time through the monochromator.

*13. A monochromator including:*

*combined supporting and housing structure provided with a separating wall portion and two terminal-slit wall portions, said separating wall portion being provided with a light-transmitting apertures;*

*two monochromator sections arranged on said combined supporting and housing structure, said two monochromator sections being contiguous at said separating wall portion, each section having a terminal slit in a corresponding one of said terminal-slit wall portions and containing a dispersing element and a pair of collimating mirrors arranged in a folded-Z configuration, whereby radiation passing through one terminal slit is transmitted by said mirrors and dispersing elements through the two monochromator sections in succession and emerges through the other terminal slit,*

*the path of transmission in each monochromator section being of folded-Z configuration, radiation being deflected along each such path only by the dispersing element and the collimating mirrors of the respective sections, the legs of the respective folded-Z paths being straight and being free from light-deflecting reflection surfaces, the legs of the respective folded-Z configurations that are optically remote from the corresponding terminal slits being collinear and extending through said light-transmitting aperture,*

*said terminal slits being defined at spaced-apart portions of said terminal-slit wall portions;*

*and said light-transmitting aperture being slightly wider than the area occupied by the monochromatic images of said terminal slits at said junction for reducing the amount of stray radiation transmitted from one terminal slit through said light-transmitting aperture to the other terminal slit, said light-transmitting aperture constituting substantially the sole region for transmission of radiation from either of said terminal slits to the other.*

*14. A monochromator as defined in claim 13 wherein the collimating mirrors of each monochromator have such focal lengths and are so arranged relative to each other and to the dispersing element and to the terminal slit in each said monochromator and to said light-transmitting*

*aperture that the optical magnification between the terminal slit of each monochromator and said light-transmitting aperture is substantially unity, and wherein*

*said light-transmitting aperture has a width just slightly greater than the monochromatic image of either terminal slit at said light-transmitting aperture.*

References Cited by the Examiner

The following references, cited by the Examiner, are of record in the patented file of this patent or the original patent.

UNITED STATES PATENTS

| | | | |
|---|---|---|---|
| 287,858 | 11/1883 | Perry | 88—61 |
| 1,727,173 | 9/1929 | Muller | 88—14 |
| 1,840,476 | 6/1932 | Twyman | 88—14 |
| 2,186,203 | 1/1940 | Centeno | 88—61 |
| 2,227,510 | 1/1941 | Pineo | 88—14 |
| 2,247,805 | 7/1941 | Faus | 88—61 |
| 2,314,800 | 3/1943 | Pineo. | |
| 2,339,053 | 1/1944 | Coleman | 88—14 X |
| 2,587,451 | 2/1952 | Farrand | 88—14 |

| | | | |
|---|---|---|---|
| 2,670,652 | 3/1954 | Sherman | 88—14 |
| 2,698,410 | 12/1954 | Madsen et al. | 88—14 X |
| 2,750,836 | 6/1956 | Fastie | 88—14 |
| 2,948,185 | 8/1960 | Ward et al. | 88—14 |

FOREIGN PATENTS

| | | |
|---|---|---|
| 362,305 | 12/1931 | Great Britain. |

OTHER REFERENCES

Fastie, W. G.: "Small Plane Grating Monochromator," pp. 641–647, Journal of the Optical Society of America, vol. 42, No. 9, September 1952.

Memoires de la Societe Royale des Sciences, vol. 1, Series 1, published by Marcel Hayez, Imprimeur de l'Academie Royale de Belgique, Brussels, Belgium, 1946, pages 537, 539 cited out of pages 535–630 and 26 plates.

Steel, W. H.: "Project d'un monochromateur double de precision," Revue D'Optique, vol. 31, June 1952, page 309.

JEWELL H. PEDERSEN, *Primary Examiner.*

R. L. WIBERT, *Assistant Examiner.*